Sept. 25, 1973 E. F. KLEINBECK ET AL 3,761,333
METHOD OF AND APPARATUS FOR MANUFACTURING OF A MAGNETIC STORAGE DISK
Filed May 21, 1971
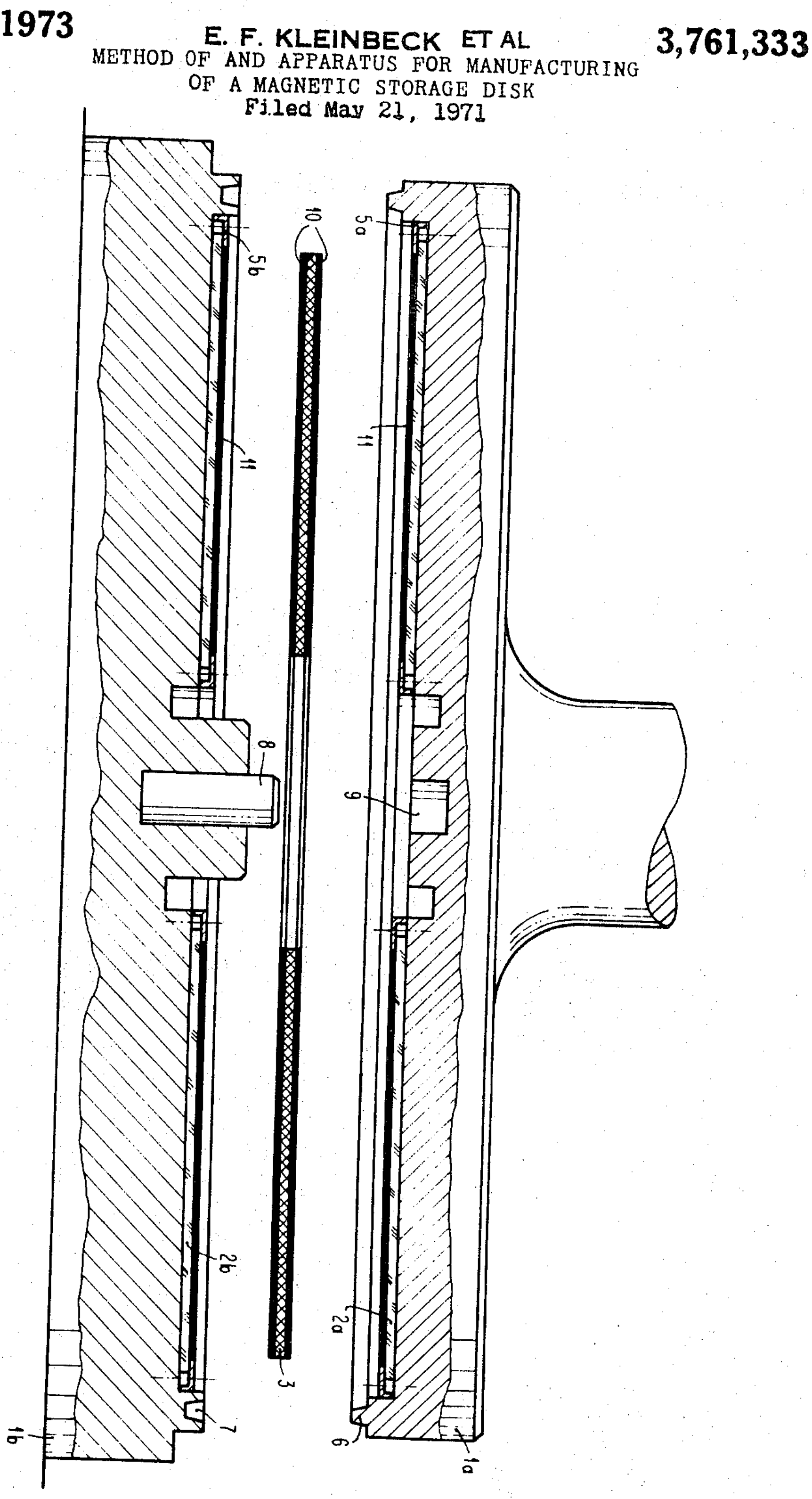
INVENTOR.
BY ERWIN F. KLEINBECK
HEINZ R. PILGRAM
Edward W. Brown
ATTORNEY

United States Patent Office 3,761,333

Patented Sept. 25, 1973

3,761,333

METHOD OF AND APPARATUS FOR MANUFACTURING OF A MAGNETIC STORAGE DISK

Erwin F. Kleinbeck, Gultlingen, and Heinz R. Pilgram, Breitenstein, Germany, assignors to International Business Machines Corporation, Armonk, N.Y.

Continuation-in-part of abandoned application Ser. No. 782,385, Dec. 9, 1968. This application May 21, 1971, Ser. No. 145,952

Int. Cl. G01n *3/00*

U.S. Cl. 156—64 6 Claims

ABSTRACT OF THE DISCLOSURE

A method of manufacturing a magnetic storage disk adapted for use in data processing systems comprising the steps of providing die means having two removable rings, applying a magnetizable material on one side of each ring to form a magnetizable layer thereon, introducing a carrier core into the die means and between said magnetizable layer on each ring, and bonding the magnetizable layers to said carrier core. This method allows the magnetizable layer to be tested prior to being bonded to the carrier core.

This application is a continuation-in-part of copending application Ser. No. 782,385, filed December 9,1968, now abandoned.

BACKGROUND OF THE INVENTION

Field of the invention

The invention relates to a method of manufacturing a magnetic storage disk for use in a data processing system, and to apparatus for carrying out the method.

Data processing systems frequently use, as peripheral equipment, magnetic disk storage having short access times, a high storage capacity and relatively low cost per bit stored. The magnetic storage disks are combined in a stack and are arranged on a joint shaft to be exchangeable by hand either individually or in the stack.

The manufacture of such storage disks is expensive and intricate as the carrier plate has to meet exacting requirements with regard to the peak-to-valley depth and planeness and the magnetic recording surface must be free from cracks and dust inclusions.

Description of the prior art

The carrier for the magnetizable layer in the known magnetic storage disks is made in most cases of aluminum or one of its alloys. Prior to the application of a satisfactory magnetizable layer, this carrier is subjected to a great number of finishing steps. The carrier plate is first of all annealed and then in most cases turned, ground, etc. The magnetizable layer is deposited on this superfinished plate and subsequently tested. If it emerges that the magnetizable layer has defects preventing it from being used in a magnetic disk storage, the complete storage disk is discarded, irrespective of the work and manufacturing cost involved. The known method has the disadvantage that the serviceability of the storage disk is only tested upon completion of all manufacturing steps. As the application of the magnetizable layers is highly intricate, resulting in great quantities of material being scrapped, such a manufacturing method is very costly.

SUMMARY OF THE INVENTION

Therefore, it is the object of the invention to provide a method of and an apparatus for manufacturing magnetizable storage disks which allow the magnetizable layer to be tested prior to its deposition on the carrier and eliminate the expensive superfinishing of the carrier plates.

In accordance with the invention, magnetic storage disks are manufactured by a method which comprises: providing die means having two removable rings; applying a magnetizable material on one side of each ring; introducing a carrier core into the die means and between said magnetizable material on each ring; bonding the magnetizable material to the carrier core. After bonding, the rings are detached from the magnetizable material adhering to the carrier core to provide a finished magnetic storage disk.

Preferably, the surfaces of the two rings facing each other in the die are at least mirror-polished.

The method in accordance with the invention allows the magnetizable layer to be tested prior to being bonded to the carrier. This way, the defects can be detected before its deposition on the carrier and thereby substantially reduce the cost of the storage disks.

BRIEF DESCRIPTION OF THE DRAWING

The foregoing and other objects, features and advantages of the invention will be apparent from the following more particular description of the invention, as illustrated in the accompanying drawing, in which:

The sole figure of the drawing shows a die suitable for the method of the invention with a finished storage disk.

The die means comprises top member 1*a* and bottom member 1*b*. One removable ring 2*a* or 2*b* each is mounted in the top member 1*a* and the bottom member 1*b*. These exchangeable rings 2*a* and 2*b* are made of glass or hard non-magnetic metal. The surfaces of the two rings 2*a* and 2*b* facing each other in the die are mirror-polished, ensuring an absolute peak-to-valley depth of the carrier 3 of 0.05$\mu$ and a planeness of the carrier of over 1$\mu$ over the full track length. The rings 2*a* and 2*b* are arranged to be removable in the members 1*a* and 1*b* of the die and are held in place by retainer rings 5*a* or 5*b*, using either screws or the known bayonet lock. On the outer circumference of the top member 1*a* of the die a sealing ring 6 is preferably mounted which, during molding, engages the corresponding groove 7 in the bottom member 1*b*. For centering the die comprises in the bottom member 1*b* a guide core 8 engaging the bore 9 in the top member 1*a*. Between the two members 1*a* and 1*b* of the die, is shown the finished storage disk consisting of the carrier 3 and the magnetizable layers 10 bonded to the carrier.

The general nature of the invention having been set forth, the following examples are now presented as to the specific preparation of magnetic storage disks. The specific details presented are for the purposes of illustration and not limitation.

EXAMPLE I

A carrier, which can be used in the method of the invention, is prepared by molding a hard plastic, such as polystyrene, containing a suitable filler, such as glass fiber or paper, in the die shown in the drawing. The filler serves as a reinforcement and is so composed and so chosen that neither the curing or aging of the plastic, water absorption, nor temperature changes lead to any essential changes of the molded carrier. For molding the carrier, the glass rings 2*a* and 2*b* of the die are made of fireproof glass and are ground to be plane-parallel. The mirror-polish on their inner faces have a peak-to-valley depth of $<0.04\mu$ and a flatness of $<0.5\mu$ over the full ring. After curing of the carrier, $Fe_2O_3$ pigment in a binder resin having a lower curing temperature than the carrier is applied to both sides of the carrier by the known centrifugal casting or spin coating method.

It will be apparent that the magnetizable layers in this example can only be tested upon completion of the coating process and that means upon completion of the disk.

EXAMPLE II

The same glass or hard non-magnetic metal rings 2*a* and 2*b* of the die, as described in Example I, are coated outside the die with $Fe_2O_3$ pigment in a binder resin. Between the glass and/or the hard non-magnetic metal ring 2*a* or 2*b* and the deposited $Fe_2O_3$-binder layer, which is shown as layer 10 on the carrier in the drawing, a parting agent 11, preferably silicon oil, is applied to prevent the $Fe_2O_3$-binder layer from permanently adhering to a glass or hard non-magnetic metal ring 2*a* or 2*b*.

After application of the parting agent and the $Fe_2O_3$-binder layer, by any suitable coating process such as spin coating as described in U.S. Pat. 3,198,657 and which constitutes no part of this invention, the $Fe_2O_3$-binder layer is hardened and tested for its magnetic disk storage properties and magnetic disk storage physical characteristics, by suitable test methods. Typical of such tests, well known in the prior art and performed at this time, are testing for missing or extra bits such as taught in U.S. Pat. 3,193,812 and 3,088,101, testing for strength and uniformity of magnetic signal such as taught in U.S. Pat. 3,328,788 and 2,922,106, measurement of surface finish such as taught in U.S. Pats. 3,102,121 and 3,043,182 and testing for uniformity of material such as taught in U.S. Pat. 2,937,368 and IBM Technical Disclosure Bulletin, vol. 9, No. 9, February 1967, none of which constitute a part of applicants' invention.

If the test is positive, that means the coated ring 2*a* or 2*b* is free from defects, the coated glass or hard non-magnetic metal ring 2*a* or 2*b* is placed in the die and secured by means of the retainer rings 5*a* and 5*b*.

After the two glass or hard non-magnetic metal rings 2*a* and 2*b* coated with the magnetizable layer 10 have been placed in the die, a carrier 3 such as a premolded core of epoxy resin laminate or a casting resin with filler is introduced, molded and cured.

During the molding and curing process, the magnetizable layers 10 are bonded to the carrier 3. After curing, the fabricated storage disk is removed from the die. The parting agent 11 between the glass or hard non-magnetic metal rings 2*a* and 2*b* and the magnetizable layer 10 ensures that the magnetizable layer 10 detach itself from its glass or hard non-magnetic metal ring 2*a* or 2*b*.

Inasmuch as the magnetizable layers 10 have been tested as early as in the manufacturing steps and curing does not affect the tested magnetic layers, the manufacture of a perfect disk at reduced costs is ensured.

EXAMPLE III

In place of the $Fe_2O_3$-binder layers, nickel-cobalt layers are deposited on the glass or hard non-magnetic metal rings 2*a* and 2*b* by a vacuum sputtering method. The bonding of the nickel-cobalt layer with the surface of the glass or hard non-magnetic metal rings 2*a* and 2*b* is avoided by the use of a parting agent 11 in the form of a silicon oil.

Upon application of the nickel-cobalt layers the magnetizable layers are tested for their magnetic quality after the first manufacturing step.

The glass or hard non-magnetic metal rings 2*a* and 2*b* which were found to be free from defects are secured in the die by means of retainer rings 5*a* and 5*b* and are adhesively bonded to a carrier to complete the storage disk.

EXAMPLE IV

The glass or hard non-magnetic metal rings 2*a* and 2*b* are not provided with a magnetizable layer but prefabricated magnetizable foils are applied to the glass or hard non-magnetic metal rings 2*a* and 2*b*, using a parting compound, Prior to being inserted, the magnetizable foils are tested for defects and magnetic properties, thus ensuring that only perfect magnetic foils are inserted in the die.

After insertion of the foil, a carrier core 3 is either molded from a hard plastic or a laminate is formed from which is built up by impregnation using a vacuum method and is thermally cured.

By this method, the magnetizable foils with their magnetizable layer are applied to the glass or hard non-magnetic metal rings 2*a* or 2*b* and differences in thickness are compensated during molding by means of the plastic so that the magnetizable layers assume the surface geometry of the glass or hard non-magnetic metal rings 2*a* and 2*b*, thus ensuring in addition to a perfect planeness, the required surface quality of the storage disks.

During the molding and or curing process, the foil is again bonded to the carrier core 3 so that upon completion of curing, a tested, perfect and serviceable storage disk is available.

While the invention has been particularly shown and described with reference to preferred embodiments thereof, it will be understood by those skilled in the art that variations in form may be made therein without departing from the spirit and scope of the invention.

What is claimed is:

1. A method of manufacturing a magnetic storage disk adapted for use in data processing systems comprising the steps of:

applying a parting agent on one side of two non-magnetic rings;

applying a magnetizable layer on one side of two non-magnetic rings;

testing prior to bonding, said magnetizable layers for their magnetic disk storage properties and magnetic disk storage physical characteristics while said layers are adhered to said rings, said tests consisting of testing for strength and uniformity of magnetic signal, measurement of surface finish and testing for uniformity of material;

placing said rings into a die means;

bonding said magnetizable layer to each side of a carrier core by heating and pressing said rings through the use of said die means against each side of the carrier core;

whereby said magnetizable layer is adhered to said carrier core and from which said rings may be separated.

2. The method of claim 1 wherein the surface of each of said rings to which said magnetizable layer is to be applied is mirror polished.

3. The method of claim 1 wherein said magnetizable layer is iron oxide pigment dispersed in a resin binder.

4. The method of claim 1 wherein said magnetizable layer is a magnetic metal.

5. The method of claim 1 wherein said parting agent is silicon oil.

6. The method of claim 1 wherein said carrier core is a glass fiber filled casting resin.

References Cited

UNITED STATES PATENTS

| | | | |
|---|---|---|---|
| 3,497,411 | 2/1970 | Chebiniak | 156—234 |
| 3,502,761 | 3/1970 | Dimitracopoulos | 264—153 |
| 3,607,528 | 9/1971 | Gassawar | 156—230 |
| 3,198,657 | 8/1965 | Kimball et al. | 274—41.4 X |
| 3,130,110 | 4/1964 | Schmidt | 161—42 |
| 3,319,315 | 5/1967 | Dike | 29—155.5 |

EDWARD G. WHITBY, Primary Examiner

U.S. Cl. X.R.

29—604; 117—235; 156—230; 274—41.4